United States Patent
Chen

(10) Patent No.: US 11,500,278 B2
(45) Date of Patent: Nov. 15, 2022

(54) WAVELENGTH-CONVERTING ELEMENT, PROJECTION APPARATUS, AND MANUFACTURING METHOD OF WAVELENGTH-CONVERTING ELEMENT

(71) Applicant: Coretronic Corporation, Hsin-Chu (TW)

(72) Inventor: I-Hua Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 854 days.

(21) Appl. No.: 16/380,999

(22) Filed: Apr. 10, 2019

(65) Prior Publication Data

US 2019/0377251 A1 Dec. 12, 2019

(30) Foreign Application Priority Data

Jun. 11, 2018 (CN) .......................... 201810594784.3

(51) Int. Cl.
*G03B 21/20* (2006.01)
*C03C 17/00* (2006.01)
*G02B 26/00* (2006.01)

(52) U.S. Cl.
CPC .......... *G03B 21/204* (2013.01); *C03C 17/007* (2013.01); *G02B 26/008* (2013.01); *G03B 21/2066* (2013.01); *C03C 2218/151* (2013.01); *C03C 2218/154* (2013.01)

(58) Field of Classification Search
CPC .......................... G03B 21/204; G03B 21/2066; C03C 17/007; C03C 2218/151; C03C 2218/154; G02B 26/008; C09K 11/02; F21V 7/30; F21V 9/30; F21V 9/32
See application file for complete search history.

(56) References Cited

U.S. PATENT DOCUMENTS

| | | | |
|---|---|---|---|
| 9,874,741 B2 * | 1/2018 | Egawa | G03B 21/204 |
| 2016/0123557 A1 | 5/2016 | Xu et al. | |
| 2016/0274353 A1 * | 9/2016 | Ando | C03C 17/007 |
| 2017/0059979 A1 * | 3/2017 | Hsu | G02B 26/008 |
| 2017/0131445 A1 | 5/2017 | Koyama | |

(Continued)

FOREIGN PATENT DOCUMENTS

| | | |
|---|---|---|
| CN | 101225942 A | 7/2008 |
| CN | 100509994 C | 7/2009 |
| CN | 102854726 A | 1/2013 |

(Continued)

OTHER PUBLICATIONS

Sino Nano Technology Corporation; Inorganic Nano Binders; Kaohsiung, Taiwan; http://www.nanosino.biz/inorganic%20nano%20system.htm#Product%20Series.

*Primary Examiner* — Bao Q Truong

(57) ABSTRACT

A wavelength-converting element includes a substrate and a wavelength-converting layer. The wavelength-converting layer is disposed on the substrate. The wavelength-converting layer includes a first inorganic binder and a wavelength-converting material. The wavelength-converting material is mixed with the first inorganic binder. The first inorganic binder includes a first alcohol-soluble inorganic binder or a first water-soluble inorganic binder. A projection apparatus using the wavelength-converting element and a manufacturing method of the wavelength-converting element are also provided.

19 Claims, 6 Drawing Sheets

(56) References Cited

U.S. PATENT DOCUMENTS

2017/0168379 A1\* 6/2017 Hashizume ............ C09K 11/02

FOREIGN PATENT DOCUMENTS

| | | | |
|---|---|---|---|
| CN | 104100933 | A | 10/2014 |
| CN | 104861864 | A | 8/2015 |
| CN | 103792767 | B | 10/2015 |
| CN | 105278225 | A | 1/2016 |
| CN | 105322433 | A | 2/2016 |
| CN | 105467734 | A | 4/2016 |
| CN | 105580144 | A | 5/2016 |
| CN | 104595852 | B | 8/2016 |
| CN | 106195922 | A | 12/2016 |
| CN | 106483746 | A | 3/2017 |
| CN | 106716189 | A | 5/2017 |
| CN | 107209447 | A | 9/2017 |
| CN | 107615113 | A | 1/2018 |
| TW | 201608005 | A | 3/2016 |
| TW | I524130 | B | 3/2016 |
| TW | I577055 | B | 4/2017 |
| TW | 201733169 | A | 9/2017 |
| TW | 201802566 | A | 1/2018 |
| TW | I614917 | B | 2/2018 |
| WO | 2016125611 | A1 | 8/2016 |

\* cited by examiner

WAVELENGTH-CONVERTING ELEMENT, PROJECTION APPARATUS, AND MANUFACTURING METHOD OF WAVELENGTH-CONVERTING ELEMENT

CROSS-REFERENCE TO RELATED APPLICATION

This Application claims the priority benefit of China Application (CN201810594784.3 filed on 2018 Jun. 11). the entirety of the above-mentioned Patent Application is hereby incorporated by reference herein and made a part of this specification.

FIELD OF THE INVENTION

The invention relates to a display apparatus, and more particularly to a wavelength-converting element, a projection apparatus using the same, and a manufacturing method of the wavelength-converting element.

BACKGROUND OF THE INVENTION

With the market requirements for projection apparatus in brightness, color saturation, service life, non-toxic environmental protection, etc., the type of a light source used in a projection apparatus is evolved from a UHP lamp, a light emitting diode (LED) to a laser diode (LD).

At present, the cost of high-brightness red laser diodes and green laser diodes is too high. In order to reduce the cost, a blue laser diode is used to excite the phosphor on the phosphor wheel to generate yellow light and green light, and then the desired red light is filtered out by a filter wheel. With the blue light emitted by the blue laser diode, the three primary colors of red, green and blue required for the projected image are formed.

The phosphor wheel is an extremely important component in projection apparatuses that currently use laser diodes as a light source. However, the phosphor powder layer of the conventional phosphor wheel uses highly transparent silica gel mixed with phosphor powder. Since the highly transparent silica gel has poor thermal conductivity and low temperature resistance, it cannot satisfy the demand of a high-power laser projection apparatus. In addition, in a conventional phosphor wheel, the diffuse reflection material needs to be cured at a high temperature of higher than 400° C. to form a diffuse reflection layer, and the diffuse reflection layer after curing has more pores, which may cause a decrease in the reflectivity of the phosphor wheel.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The invention provides a wavelength-converting element, which can improve temperature resistance and energy tolerance.

The invention provides a manufacturing method of a wavelength-converting element, which can improve the temperature resistance and energy tolerance of the wavelength-converting element.

The invention provides a projection apparatus, which can reduce the problem of image brightness degradation.

Other objectives and advantages of the invention can be further understood from the technical features disclosed by the invention.

In order to achieve one or partial or all of the above objectives or other objectives, a wavelength-converting element provided by an embodiment of the invention includes a substrate and a wavelength-converting layer. The wavelength-converting layer is disposed on the substrate. The wavelength-converting layer includes a first inorganic binder and a wavelength-converting material. The wavelength-converting material is mixed with the first inorganic binder. The first inorganic binder includes a first alcohol-soluble inorganic binder or a first water-soluble inorganic binder.

In order to achieve one or partial or all of the above objectives or other objectives, a projection apparatus provided by an embodiment of the invention includes an illumination system, a light valve and a projection lens. The illumination system is adapted to provide an illumination beam. The light valve is disposed on a transmission path of the illumination beam to convert the illumination beam into an image beam. The projection lens is disposed on a transmission path of the image beam. The illumination system includes an exciting light source and a wavelength-converting element. The exciting light source is adapted to provide an exciting beam. The wavelength-converting element is disposed on a transmission path of the exciting beam. A wavelength-converting layer of the wavelength-converting element is adapted to convert the exciting beam into a converted beam. The illumination beam includes the converted beam. The wavelength-converting element includes a substrate and the wavelength-converting layer. The wavelength-converting layer is disposed on the substrate. The wavelength-converting layer includes a first inorganic binder and a wavelength-converting material. The wavelength-converting material is mixed with the first inorganic binder. The first inorganic binder includes a first alcohol-soluble inorganic binder or a first water-soluble inorganic binder.

In order to achieve one or partial or all of the above objectives or other objectives, a manufacturing method of a wavelength-converting element provided by an embodiment of the invention includes: providing a substrate; and forming a wavelength-converting layer on the substrate, wherein the wavelength-converting layer includes a first inorganic binder and a wavelength-converting material, the wavelength-converting material is mixed with the first inorganic binder, and the first inorganic binder includes a first alcohol-soluble inorganic binder or a first water-soluble inorganic binder.

In summary, in the wavelength-converting element of the embodiment of the invention, the wavelength-converting layer includes a first inorganic binder and a wavelength-converting material, and the first inorganic binder includes a first alcohol-soluble inorganic binder or a first water-soluble inorganic binder. By using the wavelength-converting layer made by the first inorganic binder, the coating can be directly performed without the bonding of the intermediate layer. Thus, compared with the conventional wavelength-converting layer, the wavelength-converting layer of the embodiment of the invention can improve the image brightness. In addition, the wavelength-converting layer manufactured by using the first inorganic binder can further reduce the problem of softening deformation of the substrate or film stripping or film failure of the high-reflection material caused by high-temperature sintering, and can improve temperature resistance and energy tolerance, and therefore it can be used in high power projection apparatus. The manufacturing method of the wavelength-converting element according to the embodiment of the invention uses the first inorganic binder, so that the above-described wavelength-converting element can be manufactured. Since the projection apparatus according to the embodiment of the invention uses the above-described wavelength-converting element, it can reduce the problem of image brightness degradation.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
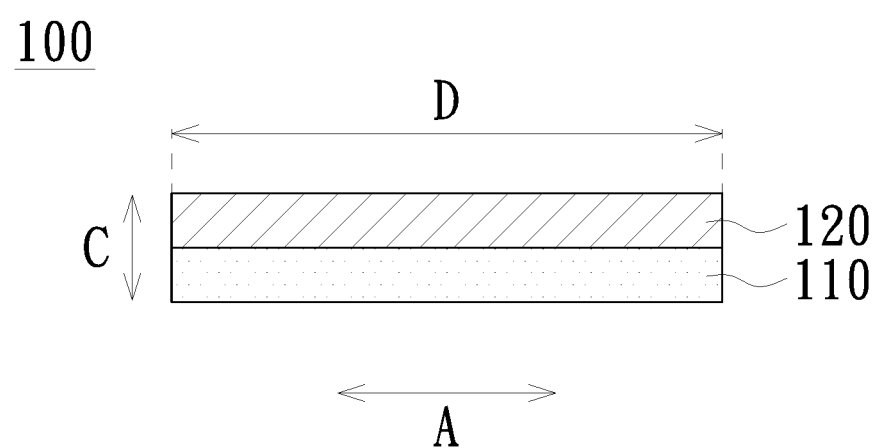
FIG. 1 is a schematic view of a wavelength-converting element according to an embodiment of the invention.

FIG. 1 is a schematic view of a wavelength-converting element according to an embodiment of the invention. Referring to FIG. 1, the wavelength-converting element 100 of the embodiment includes a substrate 110 and a wavelength-converting layer 120. The wavelength-converting element 100 is, for example, a sheet element, but is not limited thereto. In other embodiments, the wavelength-converting element 100 may also be a wavelength-converting wheel, and the substrate 110 is, for example, a turntable. The wavelength-converting layer 120 is disposed on the substrate 110. The wavelength-converting layer 120 includes a first inorganic binder and a wavelength-converting material, and the wavelength-converting material is mixed with the first inorganic binder. The first inorganic binder includes a first alcohol-soluble inorganic binder or a first water-soluble inorganic binder, and the curing temperature of the first inorganic binder is 200° C. to 300° C. The wavelength-converting material is, for example, a phosphor powder or a quantum dot, but is not limited thereto. The material of the substrate 110 is, for example, a metal, but is not limited thereto. The metal includes, for example, aluminum, an aluminum alloy, copper, a copper alloy, aluminum nitride, silicon carbide, or the like.

The component of the first alcohol-soluble inorganic binder includes, for example, siloxane and metal oxide. The metal used in the metal oxide is, for example, aluminum, titanium, zirconium, or the like.

The component of the first water-soluble inorganic binder includes, for example, at least one of silica sol, phosphate, glass paste and water glass. The properties of the first water-soluble inorganic binder are, for example, having a transparent liquid state before curing, having a viscosity less than 1000 cps, and having a light transmittance greater than 90%.

The wavelength-converting element 100 of the embodiment uses the first inorganic binder to manufacture the wavelength-converting layer 120. The first inorganic binder includes an alcohol-soluble inorganic binder or a water-soluble inorganic binder. The first inorganic binder having the above formulation has a hydroxyl group (—OH). During the process of curing and heating, adjacent hydroxyl groups will dehydrate and form bonds at about 200° C. to 300° C. For example, the surface of the colloidal particles of the silica sol in the water-soluble inorganic binder has a large amount of silanol groups (Si—OH). During the heating process, the colloidal particles approach each other, and the adjacent hydroxyl groups in the silanol groups dehydrate to form a —Si—O—Si— bond so as to achieve a curing effect. Compared to that the curing temperature of the conventional material which needs to be greater than 400° C., the curing temperature in this manner of the embodiment is only 200° C. to 300° C., and therefore the wavelength-converting layer 120 of the embodiment of the invention can reduce the fine pores generated by high temperature sintering (>400° C.) and the characteristics of easily adsorbing liquid. In addition, compared with the conventional wavelength-converting layer, the wavelength-converting layer 120 of the embodiment can improve the temperature resistance and can improve the energy tolerance at the same thickness. Taking the wavelength-converting layer having the conventional material as the phosphorus silica gel as an example, the temperature resistance of the wavelength-converting layer 120 of the embodiment can reach 400° C. to 600° C., and the temperature resistance of the conventional phosphor silica gel wavelength-converting layer is only about 200° C. The exciting beam energy that the wavelength-converting layer 120 of the embodiment can withstand is about 150% to 180% of the conventional phosphor silica gel wavelength-converting layer.

In order to achieve the above-described effect, the thickness of the wavelength-converting layer 120 of the embodiment in the direction C perpendicular to the substrate 110 is, for example, 0.10 mm to 0.25 mm. The percentage by volume of the first inorganic binder to the wavelength-converting layer 120 is, for example, 5% to 50%, and the percentage by weight is, for example, 5% to 50%.

Figure 2A:
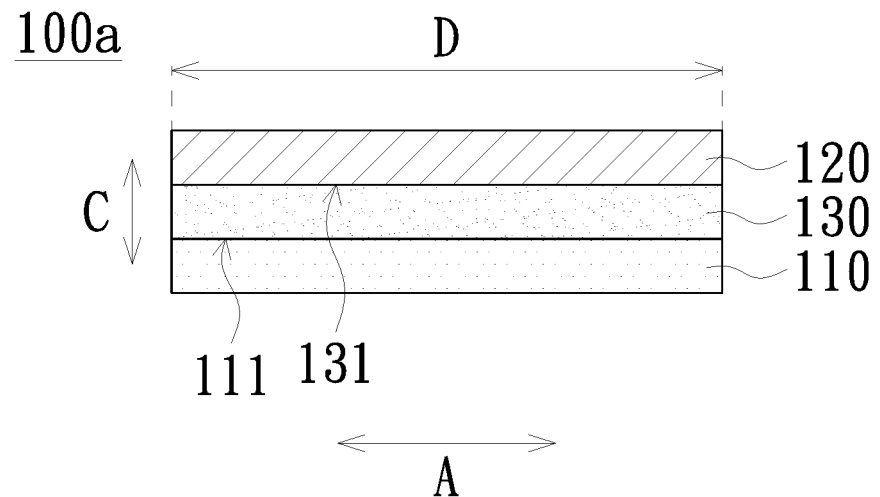
FIG. 2A is a schematic view of a wavelength-converting element according to another embodiment of the invention.
Figure 2B:
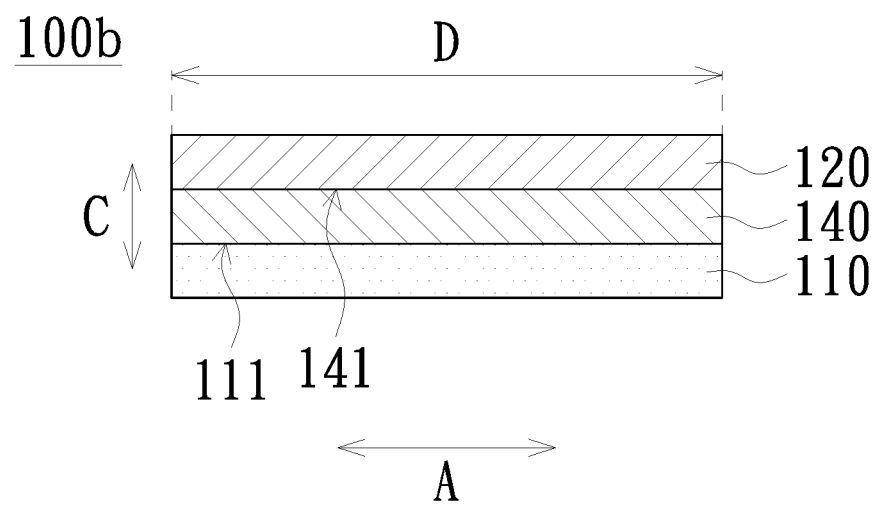
FIG. 2B is a schematic view of a wavelength-converting element according to another embodiment of the invention.

FIGS. 2A and 2B are schematic views of wavelength-converting elements according to another two embodiments of the invention. Referring to FIGS. 2A and 2B, the wavelength-converting elements 100a and 100b are similar to the wavelength-converting element 100 in function and advantages, and the main difference is that the wavelength-converting elements 100a and 100b further include, for example, a reflective layer.

In the wavelength-converting element 100a of the embodiment of FIG. 2A, the reflective layer is, for example, a high-reflection layer 130 disposed between the substrate 110 and the wavelength-converting layer 120. The material of the high-reflection layer 130 includes, for example, silver, silver alloy, aluminum, aluminum alloy, or dielectric. When the material of the high-reflection layer 130 is the metal exemplified above, at least one of a dielectric layer and a protective layer may be additionally added, and the protective layer may protect the metal from being oxidized.

In the wavelength-converting element 100b of the embodiment of FIG. 2B, the reflective layer is, for example, a diffuse reflection layer 140 disposed between the substrate 110 and the wavelength-converting layer 120. The diffuse reflection layer 140 includes a second inorganic binder and diffuse reflection particles mixed with the second inorganic binder. The second inorganic binder includes a second alcohol-soluble inorganic binder or a second water-soluble inorganic binder. The second inorganic binder may be the inorganic binder of any of the above embodiments.

The material of the above-mentioned diffuse reflection particles is, for example, white particles and includes at least one of titanium oxide, silicon dioxide, aluminum oxide, boron nitride, and zirconium dioxide, but is not limited thereto.

The wavelength-converting element 100b of the embodiment uses the second inorganic binder to manufacture the diffuse reflection layer 140. Since the second inorganic binder may be the inorganic binder of any of the above embodiments, compared to that the curing temperature of the conventional material which needs to be greater than 400° C., the curing temperature of the second inorganic binder is only 200° C. to 300° C., and therefore the diffuse reflection layer 140 of the embodiment of the invention can reduce the fine pores generated by high temperature sintering (>400° C.) and the characteristics of easily adsorbing liquid. The light can be more easily reflected when it is incident on the diffuse reflection layer 140, so that the reflectivity of the wavelength-converting element 100b can be improved. In the embodiment of the invention, the reflectivity of the diffuse reflection layer 140 for light having a wavelength of 400 nm to 700 nm is greater than or equal to 92%.

In order to achieve the above-described diffuse reflection effect, the thickness of the diffuse reflection layer 140 in the direction C perpendicular to the substrate 110 is, for example, 0.03 mm to 0.15 mm, and the particle diameter of the diffuse reflection particles is, for example, 5 nm to 500 nm. In addition, the percentage by volume of the inorganic binder to the diffuse reflection layer 140 is, for example, 10% to 80%, and the percentage by weight is, for example, 30% to 70%.

Figure 3:
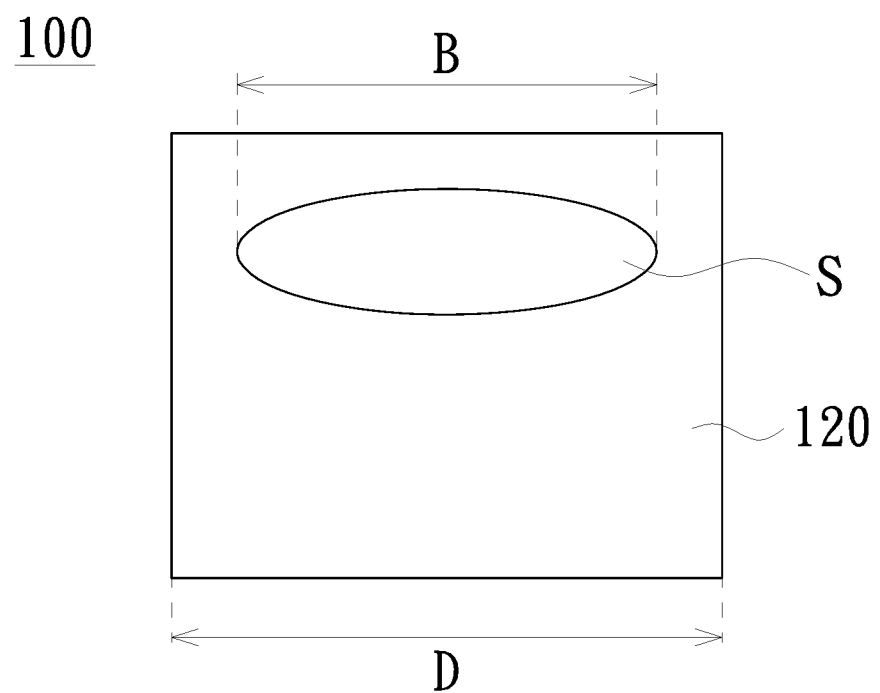
FIG. 3 is a schematic view of a light spot formed by light on a wavelength-converting element according to an embodiment of the invention.

FIG. 3 is a schematic view of a light spot formed by light on a wavelength-converting element according to an embodiment of the invention. Referring to FIGS. 1, 2 and 3, when the wavelength-converting layer 120 and the reflective layer (the high-reflection layer 120 or the diffuse reflection layer 140) are disposed on the substrate 110, the width D of the wavelength-converting layer 120 and the width D of the reflective layer (the high-reflection layer 120 or the diffuse reflection layer 140) in the direction A parallel to the substrate 110 (in the embodiment, the widths of the wavelength-converting layer 120 and the reflective layer are the same, so that both use D to represent the width thereof) both need to be greater than the long axis B of the light spot S formed by the light on the wavelength-converting elements 100, 100a and 100b (in FIG. 3, the uppermost wavelength-converting layer 120 is illustrated), so that light can be irradiated onto the wavelength-converting elements 100, 100a and 100b and thereby enhancing the utilization of light.

Figure 4A:
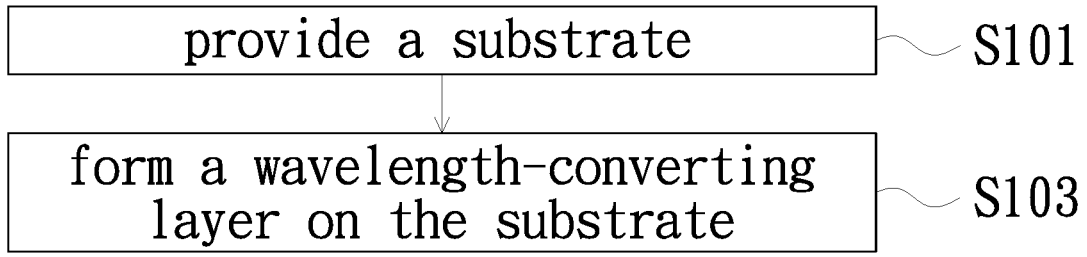
FIG. 4A is a flow chart showing a manufacturing method of a wavelength-converting element according to an embodiment of the invention.

FIG. 4A is a flow chart showing a manufacturing method of a wavelength-converting element according to an embodiment of the invention. Referring to FIGS. 1 and 4A, the manufacturing method of the wavelength-converting element 100 of the embodiment includes the following steps. Step S101: providing the substrate 110. Thereafter, step S103: forming the wavelength-converting layer 120 on the substrate 110.

Figure 4B:
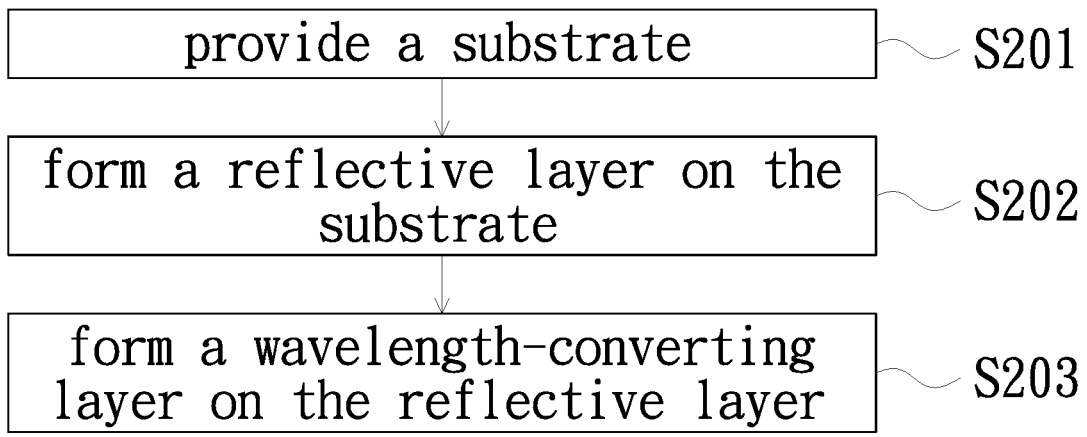
FIG. 4B is a flow chart showing a manufacturing method of a wavelength-converting element according to another embodiment of the invention.

FIG. 4B is a schematic flow chart showing a manufacturing method of a wavelength-converting element according to another embodiment of the invention. Referring to FIGS. 2A, 2B and 4B, the manufacturing method of the wavelength-converting elements 100a and 100b of the embodiment includes the following steps. Step S201: providing the substrate 110. Thereafter, step S202: forming the reflective layer on the substrate 110. Thereafter, step S203: forming the wavelength-converting layer 120 on the reflective layer. In the embodiment of FIG. 4B, the reflective layer is located between the substrate 110 and the wavelength-converting layer 120.

In the manufacturing method of FIG. 4B, taking the embodiment of FIG. 2A as an example, specifically, the reflective layer is the high-reflection layer 130. After step 201, step S202 is performed in which, for example, the high-reflection layer 130 is deposited on the first surface 111 of the substrate 110 by vapor deposition or sputtering. Thereafter, step S203 is performed in which, for example, the wavelength-converting layer 120 is coated or printed on the second surface 131 of the high reflection layer 130 away from the substrate 110, and then the wavelength-converting layer 120 is cured at a temperature of 200° C. to 300° C.

In the manufacturing method of FIG. 4B, taking the embodiment of FIG. 2B as an example, specifically, the reflective layer is the diffuse reflection layer 140. After step 201, step S202 is performed in which, for example, the diffuse reflection layer 140 is coated or printed on the first surface 111 of the substrate 110 and then the diffuse reflection layer 140 is cured at a temperature of 200° C. to 300° C. by vapor deposition or sputtering. Thereafter, step S203 is performed in which, for example, the wavelength-converting layer 120 is coated or printed on the second surface 141 of the diffuse reflection layer 140 away from the substrate 110, and then the wavelength-converting layer 120 is cured at a temperature of 200° C. to 300° C.

Taking FIG. 2B as an example. When manufacturing the wavelength-converting element 100b, the width D of the diffuse reflection layer 140 and the width D of the wavelength-converting layer 120 in the direction A parallel to the substrate 110 may be the same or different. However, in order to achieve a better diffuse reflection effect, the width ratio of the diffuse reflection layer 140 to the wavelength-converting layer 120 is, for example, 0.7 to 1.5. The coating conditions in the different embodiments will be exemplified below.

Figure 5A:
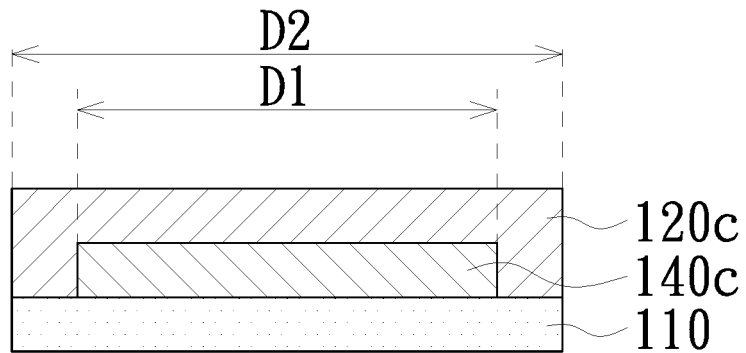
FIG. 5A is a schematic view of a wavelength-converting element according to another embodiment of the invention.
Figure 5B:
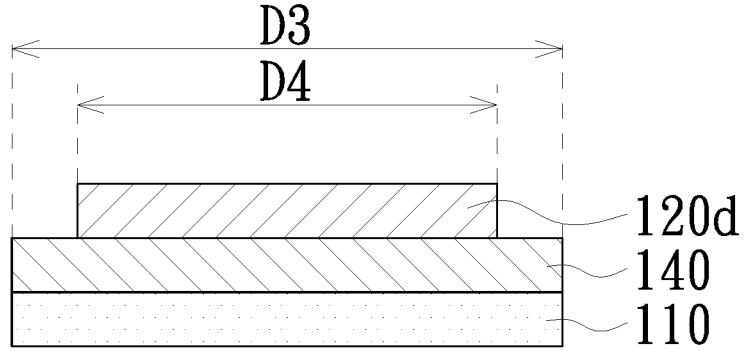
FIG. 5B is a schematic view of a wavelength-converting element according to another embodiment of the invention.

In the embodiment of FIG. 2B, the width D (hereinafter simply referred to as width) of the diffuse reflection layer 140 and the wavelength-converting layer 120 in the direction A parallel to the substrate 110 is, for example, the same. FIG. 5A is a schematic view of a wavelength-converting element 100c according to another embodiment of the invention. FIG. 5B is a schematic view of a wavelength-converting element 100d according to another embodiment of the invention. Referring to FIGS. 5A and 5B, in the embodiment in which the width D1 of the diffuse reflection layer 140c is smaller than the width D2 of the wavelength-converting layer 120c (FIG. 5A), when the wavelength-converting layer 120c is coated on the diffuse reflection layer 140c, the periphery of the wavelength-converting layer 120c may extend to cover both sides of the diffuse reflection layer 140c and is directly coated to the substrate 110 for example, so that the wavelength-converting layer 120c can be more firmly bonded to the substrate 110, and therefore the overall structure of the wavelength-converting element 100c is more stable. Further, the width D3 of the diffuse reflection layer 140 may be greater than the width D4 of the wavelength-converting layer 120d (as shown in FIG. 5B).

Figure 6:
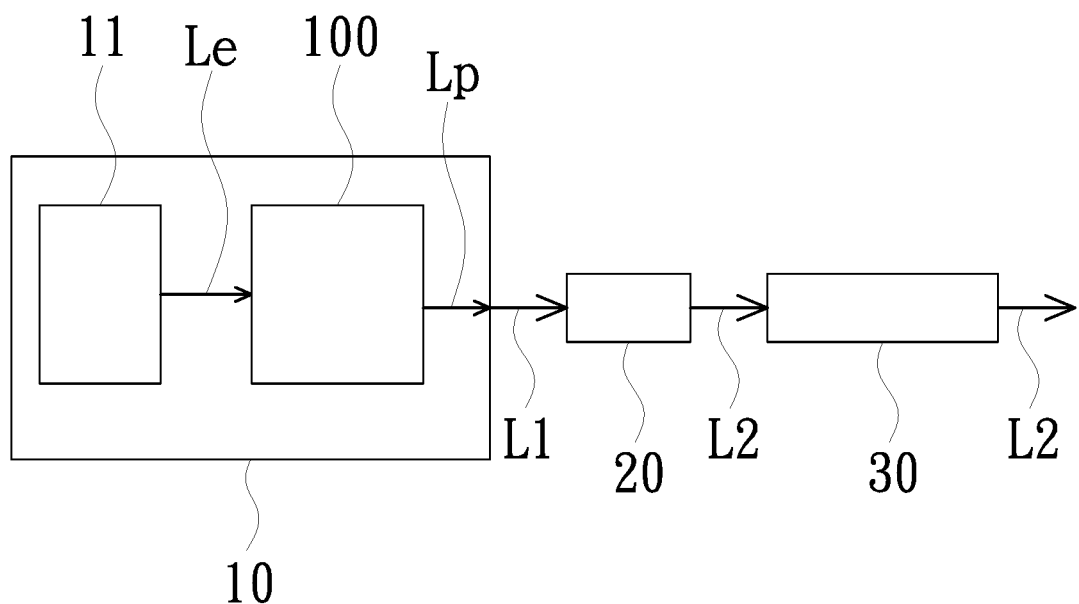
FIG. 6 is a block view of a projection apparatus according to an embodiment of the invention.

FIG. 6 is a block view of a projection apparatus according to an embodiment of the invention. Referring to FIG. 6, in the embodiment, the wavelength-converting element 100 is, for example, a wavelength-converting wheel, and the substrate 110 is, for example, a turntable. The projection apparatus 1 of the embodiment includes an illumination system 10, a light valve 20 and a projection lens 30. The illumination system 10 is adapted to provide an illumination beam L1. The illumination system 10 includes an exciting light source 11 and the above-described wavelength-converting element 100 (wavelength-converting wheel). The exciting light source 11 is adapted to provide an exciting beam Le. The wavelength-converting element 100 is disposed on the transmission path of the exciting beam Le and includes a wavelength-converting region (not shown). The wavelength-converting region includes the wavelength-converting layer 120 and the reflective layer (may be the high-reflection layer 130 or the diffuse reflection layer 140). The wavelength-converting region of the wavelength-converting element 100 is adapted to convert the exciting beam Le into a converted beam Lp, and the illumination beam L1 includes the converted beam Lp, but is not limited thereto. The illumination system 10 may further include other optical components, such as a light combining element, a filter wheel, a light homogenizing element and a condenser lens, so that the illumination beam L1 can be transmitted to the light valve 20. The light valve 20 is disposed on the transmission path of the illumination beam L1 to convert the illumination beam L1 into an image beam L2. The light valve 20 may be a transmissive light valve or a reflective light valve, wherein the transmissive light valve may be a liquid crystal display panel, and the reflective light valve may be a digital micro-mirror device (DMD) or liquid crystal on silicon panel (LCoS panel). Depending on the structure design, the number of light valves can be one or more. The projection lens 30 is disposed on the transmission path of the image beam L2 to project the image beam L2 out of the projection apparatus 1.

In FIG. 6, the wavelength-converting element 100 in FIG. 1 is taken as an example; however, the wavelength-converting element 100 may be replaced with the wavelength-converting element of any of the above embodiments.

The projection apparatus 1 of the embodiment uses the wavelength-converting element 100, 100a, 100b, 100 or 100d. Since the wavelength-converting layer 120, 120c, 120d uses the inorganic binder, and the wavelength-converting layer 120 can be directly coated on the substrate 110, or the high-reflection layer 130, the diffuse reflection layer 140, 140c can be directly coated on the substrate 110 and then the wavelength-converting layer 120, 120c, 120d is coated on the high-reflection layer 130, the diffuse reflection layer 140, 140c in the manufacturing process, therefore, there is no need to use the intermediate layer for the bonding of the substrate 110. Because the intermediate layer may affect the heat conduction and reflection effects, compared with the conventional wavelength-converting element, the wavelength-converting element 100, 100a, 100b, 100c can reduce the problem of the reflection effect affected when the exciting beam Le is incident due to passing through the intermediate layer, thereby reducing the image brightness degradation. In addition, taking an aluminum substrate as an example, a softening deformation of the substrate may occur at a temperature exceeding 300° C. Further, generally, the high-reflection layer material of the coating may have film stripping or film failure at a temperature exceeding 300° C. By using the manufacturing method of the embodiment of the invention in which the wavelength-converting layer 120 is directly coated on the substrate 110 for curing or the diffuse reflection layer 140, 140c is directly coated on the substrate for curing or the wavelength-converting layer 120 is coated on the high-reflection layer 130 for curing, since the curing temperature is 200° C. to 300° C., the problem of softening deformation of the substrate caused by the conventional material having a curing temperature of higher than 400° C. directly coated on the substrate can be reduced, or the problem of film stripping or film failure caused by the conventional material having a curing temperature of higher than 400° C. coated on the high-reflection material can be reduced. Furthermore, the wavelength-converting layers 120, 120c and 120d can improve temperature resistance and improve energy tolerance, compared to the conventional wavelength-converting layers.

Since the projection apparatus 1 of the embodiment adopts the wavelength-converting element 100b, 100c or 100d capable of improving the reflectivity, the image brightness can be improved. For example, by performing the integrating sphere brightness measurement on the wavelength-converting element 100b having the wavelength-converting layer using phosphor in glass as material and the diffuse reflection layer 140 of the embodiment of the invention and the wavelength-converting element having the wavelength-converting layer using phosphor in glass as material and the conventional diffuse reflection layer, the wavelength-converting element 100b of the embodiment of the invention can be improved by about 3% in brightness compared to the wavelength-converting element using the conventional diffuse reflection layer.

In summary, in the wavelength-converting element of the embodiment of the invention, the wavelength-converting layer includes a first inorganic binder and a wavelength-converting material, and the first inorganic binder includes a first alcohol-soluble inorganic binder or a first water-soluble inorganic binder. By using the wavelength-converting layer made by the first inorganic binder, the coating can be directly performed without the bonding of the intermediate layer. Thus, compared with the conventional wavelength-converting layer, the wavelength-converting layer of the embodiment of the invention can improve the image brightness. In addition, the wavelength-converting layer manufactured by using the first inorganic binder can further reduce the problem of softening deformation of the substrate or film stripping or film failure of the high-reflection material caused by high-temperature sintering, and can improve temperature resistance and energy tolerance, and therefore it can be used in high power projection apparatus. The manufacturing method of the wavelength-converting element according to the embodiment of the present invention uses the first inorganic binder, so that the above-described wavelength-converting element can be manufactured. Since the projection apparatus according to the embodiment of the invention uses the above-described wavelength-converting element, it can reduce the problem of image brightness degradation.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first inorganic binder, the second inorganic binder, the first alcohol-soluble inorganic binder and the second alcohol-soluble inorganic binder are only used for distinguishing various elements and do not limit the number of the elements.

What is claimed is:

1. A wavelength-converting element, comprising a substrate and a wavelength-converting layer, wherein:
    the wavelength-converting layer is disposed on the substrate, the wavelength-converting layer comprises a first inorganic binder and a wavelength-converting material, the wavelength-converting material is mixed with the first inorganic binder, and the first inorganic binder comprises a first alcohol-soluble inorganic binder or a first water-soluble inorganic binder,
    wherein the wavelength-converting element further comprises a reflective layer disposed between the substrate and the wavelength-converting layer, wherein the reflective layer of the wavelength-converting element is a diffuse reflection layer, the diffuse reflection layer comprises a second inorganic binder and a plurality of diffuse reflection particles mixed with the second inorganic binder, and the second inorganic binder comprises a second alcohol-soluble inorganic binder or a second water-soluble inorganic binder.

2. The wavelength-converting element according to claim 1, wherein the first inorganic binder of the wavelength-converting layer is the first alcohol-soluble inorganic binder, and a component of the first alcohol-soluble inorganic binder comprises silicone and metal oxide.

3. The wavelength-converting element according to claim 1, wherein the first inorganic binder of the wavelength-converting layer is the first water-soluble inorganic binder, and a component of the first water-soluble inorganic binder comprises at least one of silica sol, phosphate, glass paste and water glass.

4. The wavelength-converting element according to claim 1, wherein the second inorganic binder of the diffuse reflection layer is the second alcohol-soluble inorganic binder, and a component of the second alcohol-soluble inorganic binder comprises silicone and metal oxide.

5. The wavelength-converting element according to claim 1, wherein the second inorganic binder of the diffuse reflection layer is the second water-soluble inorganic binder, and a component of the second water-soluble inorganic binder comprises at least one of silica sol, phosphate, glass paste and water glass.

6. The wavelength-converting element according to claim 1, wherein a material of the plurality of diffuse reflection particles comprises at least one of titanium dioxide, silicon dioxide, aluminum oxide, boron nitride and zirconium dioxide.

7. The wavelength-converting element according to claim 1, wherein a width ratio of the diffuse reflection layer to the wavelength-converting layer in a direction parallel to the substrate is 0.7 to 1.5.

8. The wavelength-converting element according to claim 1, wherein the first inorganic binder of the wavelength-converting layer has a curing temperature of 200° C. to 300° C.

9. The wavelength-converting element according to claim 1, wherein the second inorganic binder of the diffuse reflection layer has a curing temperature of 200° C. to 300° C.

10. The wavelength-converting element according to claim 1, wherein the wavelength-converting element is a wavelength-converting wheel, and the substrate is a turntable.

11. A projection apparatus, comprising an illumination system, a light valve and a projection lens, wherein:
the illumination system is adapted to provide an illumination beam,
the light valve is disposed on a transmission path of the illumination beam to convert the illumination beam into an image beam,
the projection lens is disposed on a transmission path of the image beam,
the illumination system comprises an exciting light source and a wavelength-converting element, wherein:
the exciting light source is adapted to provide an exciting beam,
the wavelength-converting element is disposed on a transmission path of the exciting beam, a wavelength-converting layer of the wavelength-converting element is adapted to convert the exciting beam into a converted beam, the illumination beam comprises the converted beam, and the wavelength-converting element comprises a substrate and the wavelength-converting layer, wherein:
the wavelength-converting layer is disposed on the substrate, the wavelength-converting layer comprises a first inorganic binder and a wavelength-converting material, the wavelength-converting material is mixed with the first inorganic binder, the first inorganic binder comprises a first alcohol-soluble inorganic binder or a first water-soluble inorganic binder,
wherein the wavelength-converting element further comprises a reflective layer disposed between the substrate and the wavelength-converting layer, wherein the reflective layer of the wavelength-converting element is a diffuse reflection layer, the diffuse reflection layer comprises a second inorganic binder and a plurality of diffuse reflection particles mixed with the second inorganic binder, and the second inorganic binder comprises a second alcohol-soluble inorganic binder or a second water-soluble inorganic binder.

12. A manufacturing method of a wavelength-converting element, comprising:
providing a substrate; and
forming a wavelength-converting layer on the substrate, wherein the wavelength-converting layer comprises a first inorganic binder and a wavelength-converting material, the wavelength-converting material is mixed with the first inorganic binder, and the first inorganic binder comprises a first alcohol-soluble inorganic binder or a first water-soluble inorganic binder, wherein after the substrate is provided, a reflective layer is formed on the substrate, wherein the reflective layer is located between the substrate and the wavelength-converting layer, wherein the reflective layer is a diffuse reflection layer, the diffuse reflection layer comprises a second inorganic binder and a plurality of diffuse reflection particles mixed with the second inorganic binder, and the second inorganic binder of the diffuse reflection layer comprises a second alcohol-soluble inorganic binder or a second water-soluble inorganic binder.

13. The manufacturing method of a wavelength-converting element according to claim 12, wherein the first inorganic binder of the wavelength-converting layer is the first alcohol-soluble inorganic binder, and a component of the first alcohol-soluble inorganic binder comprises silicone and metal oxide.

14. The manufacturing method of a wavelength-converting element according to claim 12, wherein the first inorganic binder of the wavelength-converting layer is the first water-soluble inorganic binder, and a component of the first water-soluble inorganic binder comprises at least one of silica sol, phosphate, glass paste and water glass.

15. The manufacturing method of a wavelength-converting element according to claim 12, wherein the second inorganic binder of the diffuse reflection layer is the second alcohol-soluble inorganic binder, and a component of the second alcohol-soluble inorganic binder comprises silicone and metal oxide.

16. The manufacturing method of a wavelength-converting element according to claim 12, wherein the second inorganic binder of the diffuse reflection layer is the second water-soluble inorganic binder, and a component of the second water-soluble inorganic binder comprises at least one of silica sol, phosphate, glass paste and water glass.

17. The manufacturing method of a wavelength-converting element according to claim 12, wherein a method of forming the diffuse reflection layer on the substrate comprises:
coating or printing the diffuse reflection layer on a first surface of the substrate; and
curing the diffuse reflection layer.

18. The manufacturing method of a wavelength-converting element according to claim 17, wherein a method of curing the diffuse reflection layer comprises:
curing the diffuse reflection layer at a temperature of 200° C. to 300° C.

19. The manufacturing method of a wavelength-converting element according to claim 12, wherein a method of forming the wavelength-converting layer on the substrate is to form the wavelength-converting layer on the reflective layer and comprises:
coating or printing the wavelength-converting layer on a second surface of the reflective layer away from the substrate; and
curing the wavelength-converting layer at a temperature of 200° C. to 300° C.

* * * * *